United States Patent [19]

Domin

[11] Patent Number: 4,736,802

[45] Date of Patent: Apr. 12, 1988

[54] AGRICULTURAL IMPLEMENT WITH ORBITING KNIVES

[76] Inventor: Heinz Domin, Sportweg 11, D-7580 Bühl/Baden, Fed. Rep. of Germany

[21] Appl. No.: 901,773

[22] Filed: Aug. 28, 1986

[30] Foreign Application Priority Data

Sep. 3, 1985 [DE] Fed. Rep. of Germany ....... 3531436

[51] Int. Cl.$^4$ .............................................. A01B 33/06
[52] U.S. Cl. ........................................ 172/36; 172/42; 172/49.5
[58] Field of Search ................... 172/41, 42, 43, 49.5, 172/36, 46, 111, 59, 49

[56] References Cited

U.S. PATENT DOCUMENTS

| 2,088,141 | 7/1937 | Royston | 172/111 X |
| 2,619,891 | 12/1952 | Sloper | 172/59 |
| 2,625,867 | 1/1953 | Hands | 172/41 |
| 2,888,084 | 5/1959 | Trecker | 172/49.5 |
| 3,106,251 | 10/1963 | Lucas | 172/42 |
| 3,931,859 | 1/1976 | van der Lely | 172/49.5 |
| 4,003,436 | 1/1977 | Foster | 172/59 |

FOREIGN PATENT DOCUMENTS 260460 6/1963 Australia ............................ 172/49.5

Primary Examiner—Richard J. Johnson
Attorney, Agent, or Firm—Peter K. Kontler

[57] ABSTRACT

An agricultural implement with one or more pairs of knives which are eccentrically mounted on rotary knife holders and extend from the underside of a housing which can be pulled or pushed by hand or by an engine. The knives of each pair orbit in the same direction and cooperate as the blades of shears to loosen and comminute the ground. The holders are driven by a motor and the cutting edges of the knives constitute helices extending counter to the direction of orbital movement of the respective knives.

16 Claims, 3 Drawing Sheets

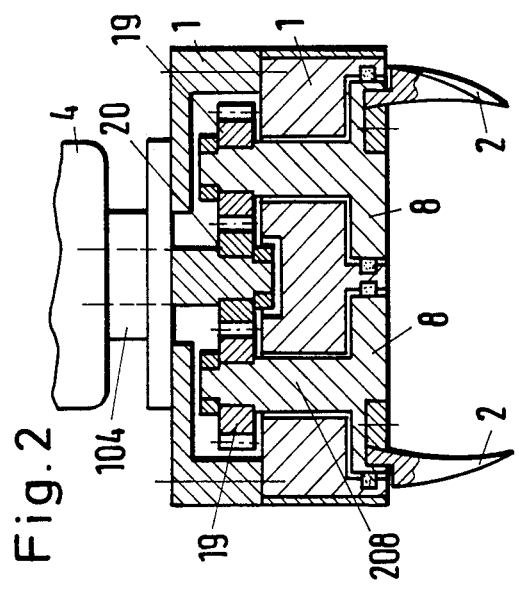
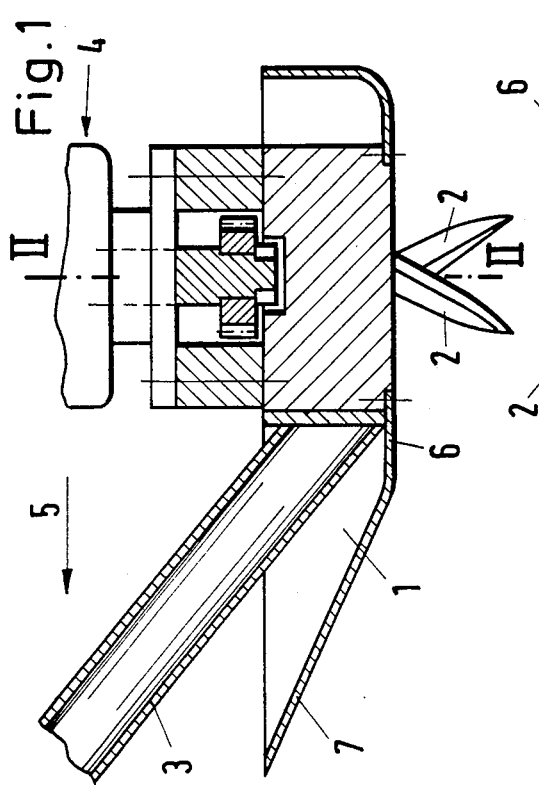
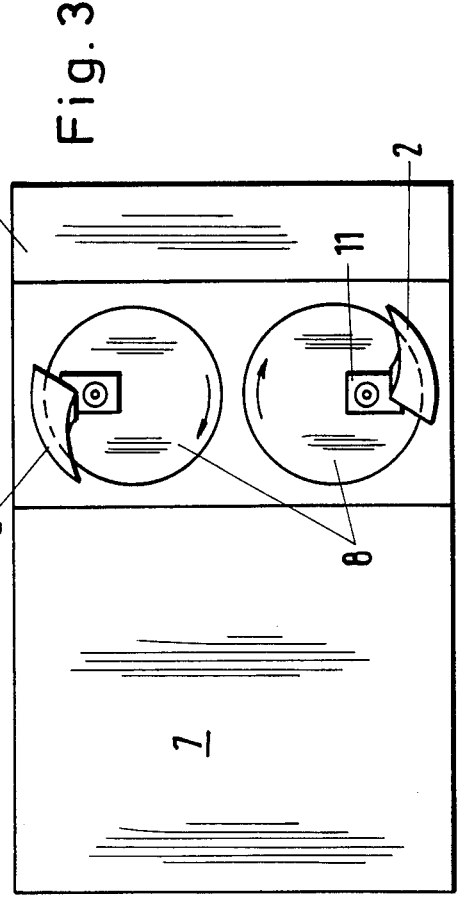

AGRICULTURAL IMPLEMENT WITH ORBITING KNIVES

BACKGROUND OF THE INVENTION

The present invention relates to agricultural implements in general, and more particularly to improvements in agricultural implements of the type wherein one or more driven knives are used to treat the material of the ground.

German Offenlegungsschrift No. 18 00 229 discloses an agricultural implement which treats the ground with several flat blade-like knives. The knives are mounted in such orientation that their planes are inclined relative to the tangents of circles which are described by the knives. Each knife serves for individual loosening of a piece of the ground and is intended to cut and break up vegetable matter in the ground.

A drawback of the implement which is disclosed in the German publication is that vegetable matter and soil tend to accumulate on the knives so that the knives must be cleaned at frequent intervals if the implement is to remain operative. Furthermore, the holder for the knives extends from the housing and prevents accurate guidance of the implement in a desired direction. Larger implements of the just described type employ several rotary knife holders which are driven to rotate in opposite directions. This causes the knives to jam when they strike upon relatively large and hard obstructions, such as pieces of rock or the like.

OBJECTS AND SUMMARY OF THE INVENTION

An object of the invention is to provide a novel and improved agricultural implement which has several knives and is constructed and assembled in such a way that all important surfaces of the knives are automatically cleaned when the implement is in use.

Another object of the invention is to provide the implement with a set of novel and improved knives.

A further object of the invention is to provide an implement which is constructed and assembled in such a way that its material comminuting and loosing elements automatically bypass larger obstructions, such as large pieces of rock or the like.

Still another object of the invention is to provide an agricultural implement which can be used with particular advantage to comminute and bury weeds in vineyards, to restore lawns and for similar purposes.

A further object of the invention is to provide novel and improved means for coupling the knives to their holders.

An additional object of the invention is to provide an implement which can be designed to treat relatively wide, medium wide or narrow strips of the material of the ground with the same degree of efficiency and reliability.

An additional object of the invention is to provide the implement with novel and improved means for comminuting and for simultaneously burying or concealing vegetable matter in the treated portion or portions of the ground.

A further object of the invention is to provide an implement which is constructed and assembled in such a way that it can readily follow a selected path without any, or without appreciable, stray movements.

An additional object of the invention is to provide the implement with novel and improved means for directing exposed vegetable matter into the range of instrumentalities which are used to comminute and bury the vegetable matter.

The invention is embodied in a ground loosening and comminuting agricultural implement which comprises a movable support having a preferably flat or substantially flat underside, and at least two discrete knives which are mounted in the support and extend beyond its underside so as to penetrate into the ground when the support is placed onto or is sufficiently close to the ground, and which are arranged to orbit about discrete predetermined axes. The implement further comprises drive means for the knives. The knives have cutting edges which cooperate in response to rotation of the knives to repeatedly act as the blades of shears and to thereby loosen and comminute the material of the ground.

The support is preferably provided with recesses or sockets which extend to its underside, and the drive means preferably comprises knife holders which are installed in the recesses and are rotatable about the respective predetermined axes. The knives are eccentrically mounted on the respective holders. The recesses are preferably circular sockets, and each holder can include or constitute a short cylinder which is received in the respective recess with a minimum of clearance or is in contact with a sealing element mounted in the support. The axes about which the knives orbit are preferably parallel to each other, and the drive means further comprises means for rotating the holders in synchronism and in the same direction. The holders are preferably closely or immediately adjacent each other and are preferably fully received in the support so that they do not extend beyond the underside of the support. In accordance with a presently preferred embodiment of the invention, the lower end faces of the holders are flush with the underside of the support.

The support can include a runner or skid which is adjacent the knives and is preferably located ahead of the knives, as considered in the direction of forward movement of the support along the ground.

The cross-sectional areas of the knives preferably diminish in a direction away from the underside of the support. The blade of each knife can constitute a prong (e.g., an elongated pyramid) having a polygonal cross-sectional outline.

The cutting edges of the knives preferably constitute portions of helices the axes of which coincide with the respective predetermined axes and which slope counter to the direction of rotation of the respective knives. The front sides of the knives are adjacent the respective cutting edges and preferably extend substantially transversely of the longitudinal direction of the respective knives. The width of such front sides is preferably substantially constant. The front sides of the knives are preferably disposed behind the respective axes, as considered in the direction of orbital movement of the knives.

The implement can comprise at least two additional discrete knives which are mounted in the support and extend beyond the underside of the support so as to penetrate into the ground when the support is placed onto or sufficiently close to the ground. The additional knives are also arranged to orbit about discrete predetermined axes, and such implement further comprises drive means for the additional knives. The additional knives have cutting edges which cooperate in response to orbiting of the additional knives to repeatedly act as the blades of shears and to thereby loosen and comminute the material of the ground. The drive means for the additional knives can constitute a component part of the drive means for the first mentioned knives.

Means are preferably provided for separably coupling the knives to the respective holders. Such coupling means preferably include first wedge-like portions which are provided on the knives and complementary second wedge-like portions. The holders have recesses (for example recesses having polygonal cross-sectional outlines) which snugly receive the respective first and second wedge-like portions. One wedge-like portion in each recess (preferably the second portion) is bolted, screwed or otherwise secured to the respective holder.

The novel features which are considered as characteristic of the invention are set forth in particular in the appended claims. The improved implement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary schematic partly elevational and partly longitudinal vertical sectional view of an implement which embodies one form of the invention;

FIG. 2 is a transverse vertical sectional view along the line II—II of FIG. 1;

FIG. 3 is a bottom plan view of the implement;

DESCRIPTION OF THE PREFERRED EMBODIMENTS

Figure 4:
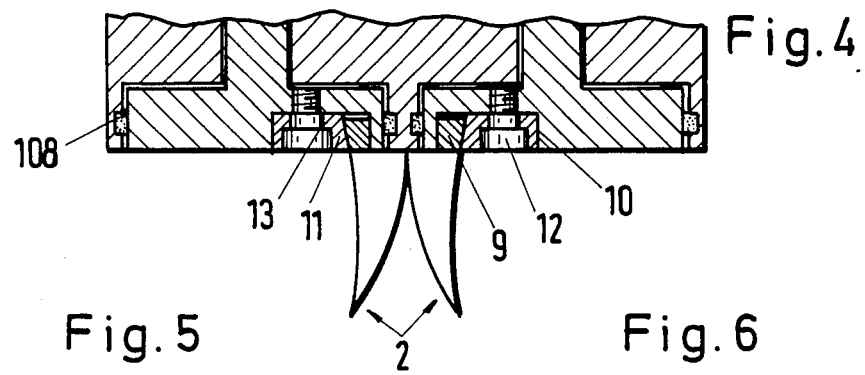
FIG. 4 is an enlarged view of a portion of the structure which is shown in FIG. 2.

The agricultural implement which is shown in FIG. 1 comprises a support 1, two knives 2, a handle 3 and a prime mover 4 (for example, an internal combustion engine) which serves to drive the holders 8 (see FIG. 2) for the knives 2. The arrow 5 indicates the direction in which the support 1 is advanced when the implement is in actual use. The handle 3 can be pushed or pulled by hand or it can be attached to a tractor or to another motor vehicle.

The underside of the rear section 6 of the support 1 is preferably flat and integral with an upwardly and forwardly sloping front section 7 which resembles a runner or skid. The transition between the sections 6, 7 of the support 1 is preferably smooth and gradual so as to ensure that only a relatively small force is necessary to pull or push the underside of the rear section 6 along the ground. Though it is possible to provide the support 1 with two runners, one at the front and the other at the rear, it is presently preferred to provide the support with a single runner as shown in FIG. 1. The inclination of the handle 3 can approximate the inclination of the underside of the front section 7 of the support 1. The prime mover 4 is mounted on top of the support 1.

FIG. 3 shows that the two holders 8, are disposed side by side and are rotatable in the same direction about parallel axes which are normal to the underside of the rear section 6 of the support 1. The knives 2 are eccentrically mounted at the undersides of the holders 8 so that they project downwardly beyond the underside of the rear section 6. Each knife 2 resemble a prong the cross-sectional area of which decreases in a direction away from the underside of the rear section 6. Such rear section is formed with two circular recesses or sockets, one for each of the holders 8. Each holder 8 resembles a relatively thin circular cylindrical disc which is confined in the support 1 in such a way that its flat lower end face is flush with the underside or the rear section 6 of the support 1. The common plane of the axes of the holders 8 extends transversely of the direction which is indicated by the arrow 5.

The manner in which the holders 8 are journalled in the support 1 and in which the upper portions 9 of the knives 2 are rigidly mounted in their holders 8 is shown in FIGS. 2 and 4. The portions 9 are integral with the exposed pottions or blades 15 (see FIG. 7) of the respective knives 2. Each portion 9 constitutes or resembles a truncated wedge which cooperates with a retaining or coupling element in the form of a complementary truncated wedge 11 in the suitably configurated recess 10 in the lower end face of the respective holder 8. The arrangement is such that the portions 9 and 11 completely or practically completely fill the respective (non-circular) recess 10 to thus prevent the knives 2 from performing any stray movements relative to the holders 8 when the portions 11 are secured to the respective holders by screws whose heads are received in suitably configurated bores or holes 12. The external threads on the shanks of such screws mate with the internal threads in tapped bores provided therefor in the corresponding holders 8. The recesses 10 can have a square, rectangular or other polygonal outline. The sockets for the holders 8 are surrounded by cylindrical surfaces having grooves for O-rings or other suitable sealing elements 108 which prevent penetration of dirt or other foreign matter into the interior of the support 1 along the peripheries of the holders 8. The inclined surfaces of the pairs of cooperating truncated wedge-like portions 9 and 11 abut each other to ensure that the knives 2 are held with a substantial force which suffices to guarantee their penetration into the ground when the holders 8 are driven by the prime mover 4 and the underside of the rear section 6 of the support 1 is placed onto or sufficiently close to the ground. The cross-sectional area of each portion 11 increases downwardly toward the lower end face of the respective holder 8 to thus ensure that the corresponding portion 9 is clamped in the respective recess 10 and is compelled to orbit about the corresponding vertical axis as soon as the holder 8 is set in rotary motion. It has been found that such types of coupling means normally suffices to ensure reliable retention of the upper portions 9 of orbiting knives 2 in the respective recesses 10, even if the holders 8 are driven at a high speed and even if the blades 15 of the knives are caused to penetrate into a relatively hard ground containing rocks and/or other hard bodies which must be shifted by the knives while the support 1 is caused to advance in the direction of the arrow 5.

The reference character 13 denotes in FIG. 4 the shoulder between the surface which surrounds the larger lowermost portion and the smaller next-to-the-lowermost portion of the respective hole or bore 12 in the portion 11 of the means for coupling the left-hand knife 2 to the corresponding holder 8.

FIGS. 2-6 show that the knives 2 are eccentric to the axes of the corresponding holders 8. The arrangement is such that the cutting edges 14 of the knife blades 15 are remotest from the axes of the respective holders 8. The cutting edges 14 resemble helices and slope rearwardly, namely counter to the direction of rotation of the respective holders 8. The holders 8 and the corresponding knives 2 are respectively identical so that their positions can be changed. The distance of each point of the cutting edge 14 of a knife 2 from the corresponding axis of rotation equals half the distance between the axes of the holders 8. When the holders 8 are rotated in directions which are indicated by the arrows, the blades 15 of the knives 2 cooperate not unlike the blades of shears to predictably comminute and loosen the material of the ground adjacent the underside of the rear section 6 of the support 1.

If the invention is embodied in a large agricultural implement, the coupling means which are shown in FIGS. 2 and 4 can be used in conjunction with or can be replaced by means for bolting or otherwise even more reliably securing the upper portions 9 of the knifes directly to the respective holders 8. Furthermore, larger implements can be provided with discrete shafts for the holders 8, i.e., each holder can be separably (for example, threadedly) connected to the lower end portion of the respective shaft. The shafts 208 for the holders 8 carry gears 19 in mesh with a gear 20 on the output shaft 104 of the prime mover 4. This ensures that the holders 8 invariably rotate in synchronism and in the same direction. The gears 19 and 20 are confined in a sealed chamber of the support 1.

Figures 5, 6:
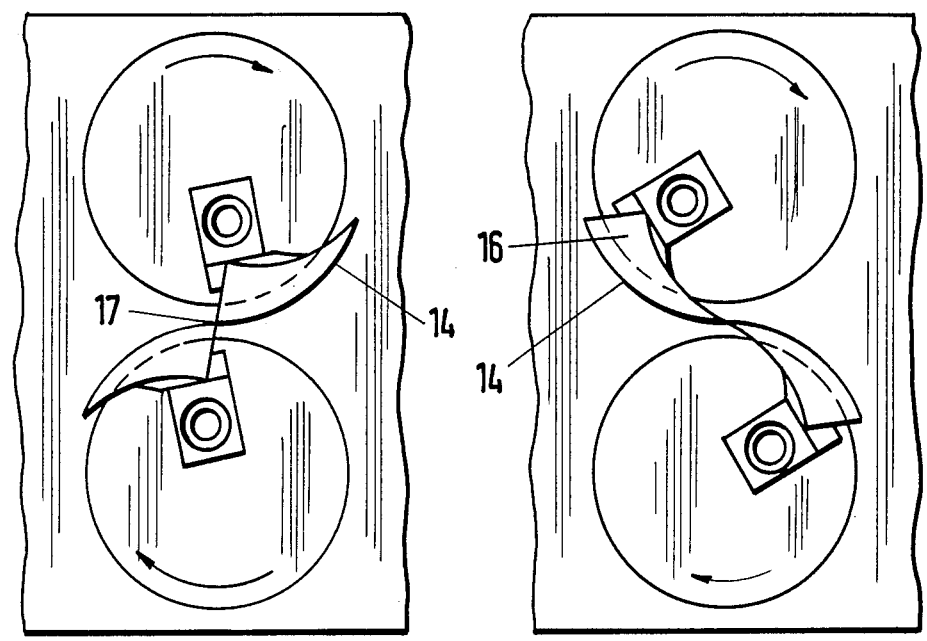
FIG. 5 is an enlarged view of a detail of the structure which is shown in FIG. 3, with the holders for the knives shown in first angular positions.
FIG. 6 shows the structure of FIG. 5 but with the knife holders in different angular positions.
Figure 7:
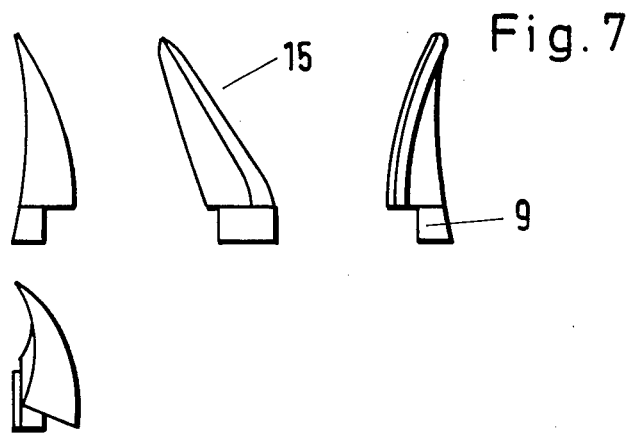
FIG. 7 shows one of the knives in four different views.

The presently preferred shapes of the knives 2 are shown in FIGS. 5, 6 and 7. The exposed portions or blades 15 of the knives 2 resemble four-sided pyramids the tips of which are remote from the underside of the rear section 6 of the support 1. Each pyramid has a substantially rectangular base adjacent the respective upper portion 9. As mentioned above, the cutting edges 14 resemble helices at the periphery of an imaginary cylinder whose axis coincides with the axis of rotation of the corresponding holder 8 and the diameter of which matches the distance between the axes of the holders. As also mentioned before, the cutting edges 14 slope counter to the direction of rotation of the respective holders 8. The selection of initial angular positions of the holders 8 is such that, when a point of one of the cutting edges 14 is located in the plane which includes the axes of the two holders, this point is adjacent a point of the other cutting edge 14. Such synchronization of angular movements of the knives 2 is ensured by the aforediscussed gear train 19, 20, 19 between the output element 104 of the prime mover 4 and the shafts 208 of the holders 8. The output element 104 is located midway between the shafts 208, and the left-hand gear 19 of FIG. 2 is identical with the right-hand gear 19.

When the holders 8 are driven by the prime mover 4, the knives 2 cooperate in such a way that the uppermost portions of the cutting edges 14 contact each other immediately below the underside of the rear section 6 of the support 1 before such contact is established between the next-following (lower) portions of the cutting edges 14. In other words, the points of contact between the cutting edges 14 travel from the topmost portions to the lowermost portions of the blades 15 during each revolution of the holders 8. Such mode of cooperation between the knives 2 is desirable and advantageous because any larger vegetable matter and/or smaller rocks which are engaged by the knives, while the holders 8 rotate, are caused to penetrate deeper into the ground. Furthermore, if the knives 2 strike a larger obstruction, e.g., a relatively large and strongly embedded rock or a piece of metal, the entire implement is caused to rise so that the knives can bypass the obstruction while the implement continues to advance in the direction of the arrow 5. It has been found that the knives 2 can readily embed in the ground smaller rocks and like objects to a depth corresponding to the shortest distance between the upper portion 9 of a knife and the tip of the respective blade 15.

FIGS. 5-7 show that the front sides or faces 16 of the knives 2 are quite wide. This is desirable and advantageous because solid pieces of material on or in the ground which are struck by the front sides 16 when the holders 8 rotate can slide off the respective front sides while the knives continue to orbit about the respective vertical axes.

FIGS. 2-6 show that the diameters of the holders 8 are somewhat smaller than the distance between their axes of rotation. This ensures the establishment of a relatively narrow web 17 between the recesses 10 for the holders 8 and allows for a more predictable sealing of the holders along their peripheral surfaces so as to prevent penetration of foreign matter into the interior of the support 1 and into the chamber for the gears 19 and 20. The provision of the web 17 renders it necessary to mount the knives 2 in such a way that the cutting edges 14 are located radially outwardly of the respective holders 8. This can be readily seen in each of FIGS. 3, 5 and 6. As mentioned above, successive points of one cutting edge 14 contact successive points of the other cutting edge 14 during each revolution of the holders 8 in such a way that the region of contact between the two knives travels from the underside of the rear section 6 of the support 1 toward the tips or lower end portions of the respective blades 15.

The top faces of the blades 15 abut, without play, the lower end faces of the respective holders 8 and the underside of the rear section 6 of the support 1. This reduces the likelihood of penetration of foreign matter into the regions of the respective upper portions 9. Such retention of the top sides or faces of the blades 15 in proper contact with the holders 8 and with the support 1 can be readily ensured by the aforediscussed coupling means which include the truncated wedge-like portions 11.

The planes of the front sides 16 of the knives 2 are located behind the respective axes of rotation, as considered in the direction of rotation of the corresponding holders 8.

Figure 8:
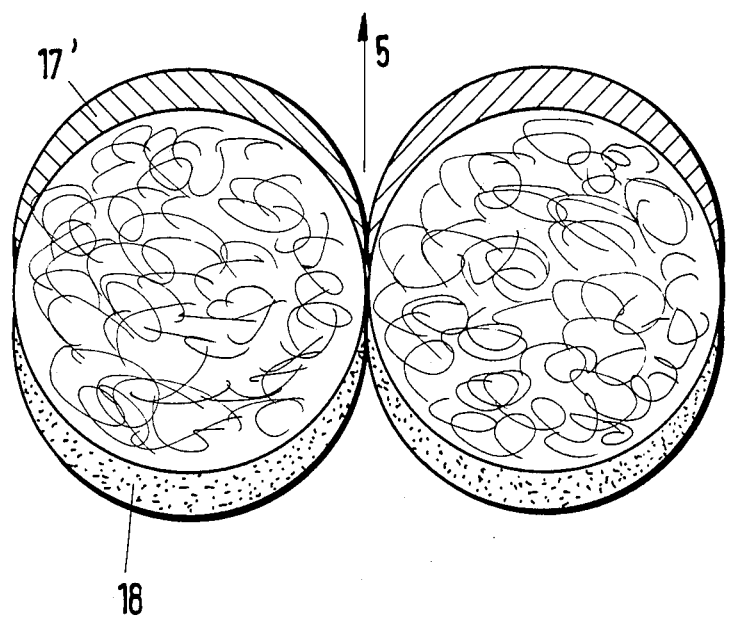
FIG. 8 shows the manner in which the material of the ground is loosened and comminuted by the knives of the implement which is shown in FIG. 1.

When the improved implement is in use, the prime mover 4 is on to orbit the knives 2 about the respective vertical or substantially vertical axes while the underside of the rear section 6 of the support 1 contacts the ground or is sufficiently close thereto to enable the blades 15 to penetrate into the material of the ground and to dig two circular holes of the type shown in FIG. 8. The holes are immediately adjacent each other and, as the implement advances in the direction of the arrow 5, the blades 15 loosen and remove crescent-shaped portions 17' of material ahead of the respective holes. Such material is deposited in the crescent-shaped rear regions 18, i.e., the blades 15 simultaneously loosen strips of the material of the ground at opposite sides of the plane of the arrow 5 which is shown in FIG. 8. Each revolution of the holders 8 results in removal of a crescent-shaped layer 17' in front of the respective circular hole and in the deposition of a crescent-shaped layer of comminuted and loosened material in the corresponding rear region 18. Each layer 17' is caused to move downwardly and toward the center of the respective circular hole in the ground because the front sides 16 of the blades 15 slope in a manner as shown in FIGS. 5 and 6 and also because the planes of such front sides are located rearwardly of the respective axes of rotation, as considered in directions in which the corresponding holders 8 rotate. After each half revolution of a holder 8, the corresponding knife 2 is located at the rear of the corresponding hole in the ground (as considered in the direction of the arrow 5) and the knife then proceeds to comminute the entrained material and deposit the comminuted and loosened material in the respective rear region 18. The comminuting action is more satisfactory if the speed of forward movement of the implement is reduced, i.e., if the quantity of material in the crescent-shaped layers 17' is reduced. Furthermore, the comminuting and loosening action can be improved by increasing the rotational speed of the holders 8.

The aforediscussed configuration, orientation and mounting of the blades 15 further reduce the likelihood of accumulation of substantial quantities of comminuted material on the surfaces of the blades. If any accumulations take place, the material gathers at surfaces other than the front sides 16 of the blades 15. This presents no problems because the front sides 16 are automatically wiped clean in response to repeated penetration into the material of the ground. Furthermore, the material cannot adhere to the cutting edges 15 so that the loosening and comminuting action of the blades 15 is highly predictable.

The loosened and comminuted material in the rear regions 18 is smoothed and evened by the underside of the rear section 6 of the support 1 while the implement advances in the direction of the arrow 5 so that the implement leaves behind it a relatively wide strip of loosened and flattened material having a width corresponding to twice the distance between the axes of the holders 8.

Figure 9:
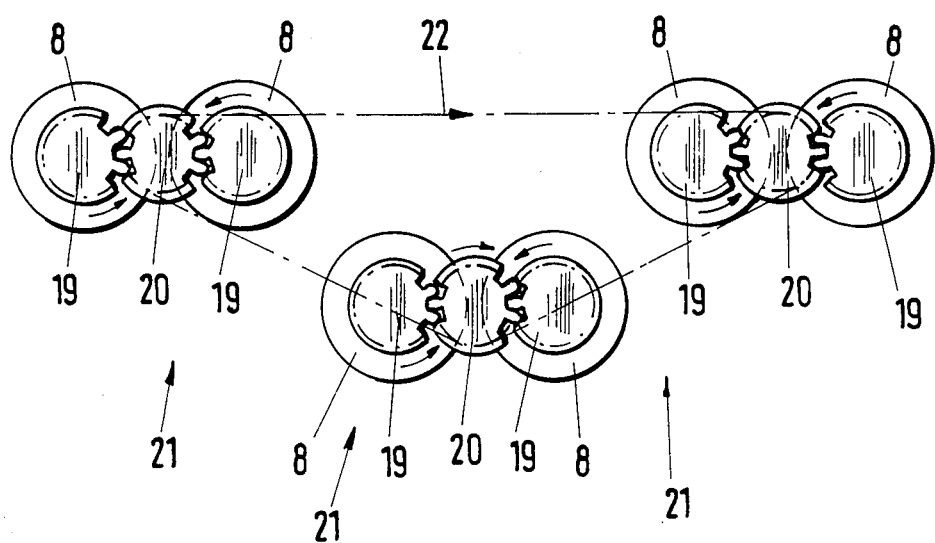
FIG. 9 is a diagrammatic view of certain details of a modified implement with three pairs of orbiting knives.

FIG. 9 shows certain parts of a modified agricultural implement with three pairs of knives forming three neighboring units 21. The holders 8 for the knives 2 of each pair carry gears 19 which mate with an intermediate gear 20. The intermediate gears 20 are driven by an endless chain 22. One of the gears 20 (preferably the median gear 20 of FIG. 9) is driven by the prime mover which is not shown in FIG. 9. Such mounting of the driven gear 20 reduces the likelihood that the implement would tend to stray to the left or to the right during movement along the ground. The median unit 21 is preferably located behind the two lateral units 21 (as considered in the direction of forward movement of the implement) in order to further reduce the likelihood of stray movements of the knives when the implement is in actual use. The distance between the two lateral units 21 of FIG. 9 is preferably such that the strips of ground which are treated by the lateral units abut or slightly overlap the strip which is treated by the knives of the median unit 21.

The mounting of the prime mover in such a way that it drives the central gear 20 of FIG. 9 is preferred on the additional ground that this ensures a more uniform distribution of the weight and further reduces the likelihood of stray movements of the implement when the support for the three units 21 advances forwardly (upwardly as seen in the FIG. 9) and the knives are caused to penetrate into the ground.

It is also within the scope of the invention to provide the implement with one or more pairs of knives which extend vertically downwardly from the underside of the rear section of the support. This entails a reduction of cost while still ensuring that the implement will exhibit at least some advantages of the illustrated implements. The configuration and orientation of the blades 15 in a manner as shown in FIGS. 1 to 7 is particularly desirable and advantageous because this ensures that the important surfaces and the cutting edges of the blades 15 are cleaned automatically when the implement is in use.

The aforementioned manner in which the blades 15 of each pair of knives 2 cooperate not unlike the blades of shears is highly desirable and advantageous if it is desired to comminute roots, stalks and other vegetable matter in or on the ground. All that is necessary is to ensure that the holders 8 are rotated at a relatively high speed and that the speed of forward movement of the support 1 for the knives 2 and their drive means is not excessive so that each and every piece of vegetation which is encountered by the blades 15 is effectively and reliably comminuted into minute fragments. It has been found that weeds which are treated by the blades 15 are comminuted to such an extent that they are highly unlikely to sprout again. The material of the crescent-shaped layers 17' in front of circular holes which are made by the orbiting blades 15 during forward movement of the implement along the ground is comminuted again and again. The number of comminuting and loosening actions upon each layer 17' depends on the rotational speed of the holders 8 and on the speed of forward movement of the implement along the ground so that, by properly selecting such parameters, the operator ensures that the implement leaves behind it a strip of finely comminuted and loosened material which is often desirable in vineyards, on lawns and elsewhere. Extensive experiments with the improved implement have shown that the operation is free of shocks as well as that the implement exhibits little or no tendency to sway laterally from the intended direction of its forward movement. It is very simple to ensure that the implement will travel along a straight path or along any other desired path in order to treat a selected part of the ground in an eye-pleasing manner as well as in such a way that neighboring strips of treated material are immediately adjacent each other. This reduces unnecessary work and ensures that each and every piece of a selected part of the ground is treated with the same degree of intensity.

Eccentric mounting of the knives 2 in their holders 8 is desirable and advantageous because vegetable matter and other materials which are loosened during penetration of blades 15 into the ground are less likely to become convoluted around the blades 15 and to interfere with predictable treatment of the ground.

The placing of the lower end faces of the holders 8 into the plane of the underside of the preferably flat rear section 6 of the support 1 enhances the stability of the entire implement, not only in a sense to reduce the likelihood of tilting of the implement from side to side but also in a sense to reduce the likelihood of lateral stray movements of the entire implement. Moreover, the placing of lower end faces of the holders 8 into a plane which includes the underside of the rear section 6 reduces the likelihood of undesirable and uncontrollable circulation of loosened material by protruding holders. This could result in propulsion of loosened material well beyond the treated area. Such advantage of the improved implement is particularly important when it is used on steep slopes, for example, in vineyards. The implement can treat the material along a strongly sloping ground without the need for any subsequent smoothing or leveling of the ground behind the support. This saves time, effort and costs. The upper side of the treated area is smooth. In other words, there is no need for subsequent treatment for the sole purpose of leveling the freshly comminuted material of the ground.

The skid or runner 7 of the support 1 can perform the important and desirable function of flexing or breaking upwardly projecting parts of the vegetation along the ground so that stalks, leaves and other exposed parts of vegetation (such as weeds) are held close to the ground and are more likely to be engaged and comminuted by the blades 15. Moreover, the skid 7 ensures that folded, deflected or bent portions of vegetation cannot move laterally out of the range of the orbiting blades 15 which also contributes to more predictable comminution of vegetable matter along the treated portion of the ground.

The skid 7 performs the additional important function of reducing the resistance which the entire implement offers to forward movement in the direction of the arrow 5. Numerous experiments indicate that pulling of the support 1 along the ground is often preferred to pushing. Such mode of advancing the implement reduces the tendency of the support 1 to penetrate into the ground. The likelihood of penetration of the support 1 into the ground is further reduced due to the provision of the skid 7 the underside of which slopes upwardly and forwardly in the direction of desired movement of the implement. Still further, such mode of advancing the implement ensures that the underside of the skid 7, as well as the underside of the rear section 6 of the support 1, is automatically cleaned and actually polished during forward movement of the implement.

The utulization of prong-like blades 15 with cross-sectional areas which diminish in a direction away from the underside of the rear section 6 of the support 1 is desirable and advantageous because such blades can more readily penetrate into the ground. Furthermore, the aforediscussed configuration, inclination and orientation of front sides 16 of the blades 15 imparts to the blades a tendency to lift the support 1 above and away from the ground. This is often of advantage because the support 1 is less likely to exhibit a tendency to penetrate into the ground which would necessitate the exertion of a greater effect in order to advance the implement in the desired direction.

The utilization of cutting edges 14 in the form of helices, together with the aforediscussed configuration of the front sides 16 of the blades 15, ensures that vegetable matter which is engaged and comminuted by the blades 15 is pushed into the loosened portion of the ground to a depth which can equal the shortest distance of the tips of blades 15 from the upper portions 9 of the respective knives 2. The comminuted particles of vegetation are pushed into the ground by the front sides 16.

The front sides 16 can embed in the material of the ground fragments of comminuted vegetable matter as well as solid objects including rocks, pieces of wood, nails and others. Moreover, the tendency of the blades 15 to bury the comminuted vegetable matter and/or solid particles, such as rocks or the like, reduces the likelihood of jamming of the knives 2. Cleaning of the knives 2 takes place automatically in response to rotation of the corresponding holders 8. If the blades 15 happen to strike against a large obstruction, the front sides 16 of the orbiting knives 2 simply lift the entire implement so that the blades 15 can ride over the obstruction to thereupon again penetrate into the ground. The width of major portions at least of the front sides 16 of blades 15 is preferably constant or substantially constant and matches or equals the width of the maximum cross-sectional areas of the blades. The utilization of relatively wide front sides 16 is desirable and advantageous because the blades 15 are more likely to steer the adjacent particulate material in the desired direction. Moreover, this contributes to and enhances an automatic cleaning action. The placing of the front sides 16 behind the corresponding axes of rotation is desirable and advantageous because this guarantees that the loosened and comminuted material is returned into the range of the orbiting blades 15 and undergoes a repeated loosening and comminuting action.

As mentioned above, the improved implement can be pulled or pushed by hand. However, and expecially if the implement is relatively large (refer to FIG. 9), it may be desirable and advantageous to employ a tractor or another motor-deiven pulling or pushing vehicle.

If the implement employs several pairs of orbiting knives, the dimensions of paths of orbital movement of all knives may but need not be the same. For example, the distance of the knives of the two lateral units 21 shown in FIG. 9 from the corresponding axes can be greater than the distance of the two knives of the centrally located unit 21 from the corresponding axes. It is further clear that the length of the blades 15 of the knives 2 can be varied within a wide range as well as that the length of all blades may but need not be the same.

The placing of coupling means (9, 11) at the undersides of the respective holders 8 renders it possible to replace a broken or otherwise damaged or worn knife 2, whenever necessary, without the need for even partial dismantling of or the implement.

If the ground which is to be treated is very hard, the implement can be provided with means for pushing the support 1 toward the ground. For example, if the handle 3 is attached to the rear end of a tractor, the tractor can be provided with hydraulically or otherwise operated means for pushing the support downwardly toward the ground. The pushing means can comprise one or more fluid-operated cylinder and piston units of conventional design. Hydraulic means for pushing ground-treating implements downwardly are known from the field of road building and repairing machines.

The vehicle which pulls or pushes the improved implement can further serve to simultaneously push or pull a device which distributes seeds into the freshly treated material of the ground as well as one or more leveling or smoothing rollers or similar devices which roll over the material upon completed distribution of seeds. By way of example, the just discussed combination of implements can be used to comminute the vegetable matter of a damaged or destroyed lawn, to implant seeds, and to simultaneously or immediately thereafter level the ground upon completed implantation of seeds. The jointly used implements do not affect the configuration of the ground; on the contrary, they can level the ground in a highly desirable manner. Such utilization of a combination of two or more implements can be employed with advantage for rapid and effective restoring of lawns in outdoor sports stadia and in similar establishments. It has been found that a large area can be treated within a surprisingly short interval of time.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A ground loosening and comminuting agricultural implement, comprising a movable support having an underside; at least two discret knives mounted on said support, extending beyond said underside so as to penetrate into the ground when said support is placed onto or is sufficiently close to the ground, and being arranged to orbit with reference to said support about separate predetermined axes; and drive means for orbiting said knives in the same direction, said knives having cutting edges which cooperate in response to orbiting of the knives to repeatedly act as the blades of shears and to thereby loosen and comminute the material of the ground, the cutting edges of said knives contacting each other at points which travel in a direction from said underside into the ground during each orbit of said knives.

2. The implement of claim 1, wherein said support has recesses extending to said underside and said drive means comprises knife holders installed in said recesses and rotatable about said axes, said knives being eccentrically mounted in the respective holders.

3. The implement of claim 2, wherein said recesses are circular sockets and said holders are cylinders which are received in the respective sockets.

4. The implement of claim 2, wherein said axes are parallel to each other and said drive means further comprises means for rotating said holders in synchronism.

5. The implement of claim 4, wherein said holders are closely adjacent each other and are fully received in said support.

6. The implement of claim 4, wherein said holders have end faces which are flush with the underside of said support.

7. The implement of claim 1, wherein said support includes a skid adjacent said knives.

8. The implement of claim 1, wherein the cross-sectional areas of said knives diminish in a direction away from the underside of said support.

9. The implement of claim 8, wherein said knives have prongs with polygonal cross-sectional outlines.

10. The implement of claim 1, wherein said edges constitute portions of helices whose axes coincide with the respective predetermined axes and which slope counter to the direction of rotation of the corresponding knives.

11. The implement of claim 1, wherein said knives are elongated and have front sides adjacent the respective cutting edges, said front sides extending substantially transversely of the longitudinal directions of the respective knives.

12. The implement of claim 11, wherein the width of portions at least of said front sides is substantially constant.

13. The implement of claim 1, wherein said knives have front sides which are disposed behind the respective axes in the direction of orbital movement of the knives.

14. The implement of claim 1, further comprising at least two additional discrete knives mounted in said support, extending beyond said underside so as to penetrate into the ground when said support is placed onto or sufficiently close to the ground, and being arranged to orbit about discrete predetermined axes, and drive means for said additional knives, said additional knives having cutting edges which cooperate in response to orbiting of said additional knives to repeatedly act as the blades of shears and to thereby loosen and comminute the material of the ground.

15. The implement of claim 1, wherein said drive means comprises rotary knife holders journalled in said support for rotation about the respective predetermined axes, and further comprising means for separably coupling said knives to the respective holders including first wedge-like portions provided on said knives and complementary second wedge-like portions, said holders having recesses snugly receiving the respective first and second wedge-like portions.

16. A ground loosening and comminuting agricultural implement, comprising a movable support having an underside; at least two discrete knives mounted in said support, extending beyond said underside so as to penetrate into the ground when said support is placed onto or sufficiently close to the ground, and being arranged to orbit about discrete predetermined axes; drive means for said knives, said knives having cutting edges which cooperate in response to orbiting of the knives to repeatedly act as the blades of shears and to thereby loosen and comminute the material of the ground, said drive means comprising rotary knife holders journalled in said support for rotation about the respective predetermined axes; and means for separably coupling said knives to the respective holders, including first wedge-like portions provided on said knives and complementary second wedge-like portions, said holders having recesses snugly receiving the respective first and second wedge-like portions.

* * * * *